(12) United States Patent
Draak et al.

(10) Patent No.: US 11,398,753 B2
(45) Date of Patent: Jul. 26, 2022

(54) METHOD AND APPARATUS FOR WIRELESS POWER TRANSFER UTILIZING A MAGNETIC SHIELD

(71) Applicant: KONINKLIJKE PHILIPS N.V., Eindhoven (NL)

(72) Inventors: Johannes Wilhelmus Draak, Horst (NL); Klaas Jacob Lulofs, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/267,514

(22) PCT Filed: Aug. 5, 2019

(86) PCT No.: PCT/EP2019/071021
§ 371 (c)(1),
(2) Date: Feb. 10, 2021

(87) PCT Pub. No.: WO2020/035343
PCT Pub. Date: Feb. 20, 2020

(65) Prior Publication Data
US 2021/0320535 A1     Oct. 14, 2021

(30) Foreign Application Priority Data
Aug. 15, 2018   (EP) .................................... 18189122

(51) Int. Cl.
*H02J 50/70*     (2016.01)
*H02J 50/12*     (2016.01)
(Continued)

(52) U.S. Cl.
CPC ............. *H02J 50/70* (2016.02); *H01F 27/36* (2013.01); *H01F 27/366* (2020.08); *H02J 50/12* (2016.02);
(Continued)

(58) Field of Classification Search
CPC .. H02J 50/00; H02J 50/70; H04B 5/00; H01F 27/36
See application file for complete search history.

(56) References Cited

U.S. PATENT DOCUMENTS 8,643,219 B2    2/2014  Yabe et al.
2012/0112552 A1  5/2012  Baarman et al.
(Continued)

FOREIGN PATENT DOCUMENTS

EP   2648135 A1     10/2013
EP   2775632 A1     9/2014
WO   2012040548 A1  3/2012

OTHER PUBLICATIONS

International Search Report and Written Opinion From PCT/EP2019/071021 dated Oct. 24, 2019.

*Primary Examiner* — Adi Amrany

(57) ABSTRACT

A device being a power receiver or power transmitter of a wireless power transfer system transfer powers via a power transfer signal: The device comprises power transfer coil (103, 107) for receiving or generating the power transfer signal and a communication antenna (207, 307) for communicating with the power receiver (105) or the power transmitter (101) via a communication signal. The communication antenna (207, 307) overlaps the power transfer coil (103, 107). A magnetic shielding element (503, 505) is positioned between the power transfer coil (103, 107) and the communication antenna (207, 307). A controller (201, 301) controls the device to perform power transfer during power transfer intervals and communication during communication time intervals, the power transfer intervals and communication time intervals being disjoint. The magnetic shielding element (503, 505) comprises a magnetic shield material arranged to operate in a saturated mode during (Continued)

power transfer intervals and in a non-saturated mode during communication time intervals.

25 Claims, 14 Drawing Sheets

(51) Int. Cl.
*H01F 27/36* (2006.01)
*H04B 5/00* (2006.01)
(52) U.S. Cl.
CPC ......... *H04B 5/0037* (2013.01); *H04B 5/0081* (2013.01)

(56) References Cited

U.S. PATENT DOCUMENTS

| | | | |
|---|---|---|---|
| 2013/0181535 A1* | 7/2013 | Muratov | H02J 50/10 307/104 |
| 2013/0249312 A1 | 9/2013 | Uchida et al. | |
| 2014/0168019 A1 | 6/2014 | Hirobe | |
| 2016/0352138 A1 | 12/2016 | Hirobe | |
| 2018/0124959 A1* | 5/2018 | Saab | H04B 5/0037 |
| 2018/0219400 A1 | 8/2018 | Jin | |

* cited by examiner

METHOD AND APPARATUS FOR WIRELESS POWER TRANSFER UTILIZING A MAGNETIC SHIELD

CROSS-REFERENCE TO PRIOR APPLICATIONS

This application is the U.S. National Phase application under 35 U.S.C. § 371 of International Application No. PCT/EP2019/071021, filed on Aug. 5, 2019, which claims the benefit of EP Patent Application No. EP 18189122.7, filed on Aug. 15, 2018. These applications are hereby incorporated by reference herein.

FIELD OF THE INVENTION

The invention relates to wireless power transfer system and in particular, but not exclusively, to a device and method for supporting high power wireless power transfer, such as for example for supporting kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

In power transfer systems, such as Qi, the electromagnetic field generated to transfer the required levels of power to the power receiver is often very substantial. The presence of such a strong field may in many situations have an impact on the surroundings. For example, a potential problem with wireless power transfer is that power may unintentionally be transferred to e.g. metallic objects that happen to be in the vicinity of the power transmitter.

In order to support efficient wireless power transfer, wireless power transfer systems, such as Qi based systems, utilize substantial communication between the power transmitter and the power receiver. Initially, Qi supported only communication from the power receiver to the power transmitter using load modulation of the power transfer signal. However, developments of the standard have introduced bilateral communication and many functions are supported by communication exchanges between the power receiver and the power transmitter. In many systems, the communication from the power transmitter to the power receiver is accomplished by modulating the power transfer signal. However, it has also been proposed to use communication functionality which is independent of the power transfer signal and which does not use the power transfer signal as a carrier being modulated. For example, the communication between power transmitter and power receiver may be achieved by a short range communication system such as RFID/NFC communication approaches.

Using a separate communication approach may in many situations provide improved performance and may e.g. provide faster communication with a higher communication reliability and a reduced impact on the ongoing power transfer. However, a particular challenge with using a separate communication approach is that the power transfer functionality and operation tend to interfere with the communication and may cause significant degradation of the communication performance.

Hence, an improved power transfer device and method therefor would be advantageous, in particular, an approach allowing increased flexibility, reduced cost, reduced complexity, improved communication, backwards compatibility, improved power transfer operation, reduced interference between power transfer and communication, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided device for wireless power transfer from a power transmitter to a power receiver using an electromagnetic power transfer signal, the device being one of the power transmitter and the power receiver, the device comprising: a power transfer coil for receiving or generating the power transfer signal; a communication antenna for communicating with a complementary device being the other device of the power receiver and the power transmitter via a communication signal, the communication antenna overlapping the power transfer coil; a magnetic shielding element positioned between the power transfer coil and the communication antenna; a controller for controlling the device to perform power transfer during power transfer intervals and communication during communication time intervals; wherein the magnetic shielding element comprises a magnetic shield material having a saturation point such that it operates in a saturated mode during power transfer intervals and in a non-saturated mode during communication time intervals; the saturation point corresponds to a magnetic field strength higher than generated by the communication signal during the communication time intervals and lower than generated by the power transfer signal during the power transfer time intervals; and the power transfer coil and the communication antenna are arranged such that the communication antenna is positioned between the power transfer coil and a power transfer coil of the complementary device during power transfer operation.

The invention may provide improved performance in many scenarios. It may in many embodiments allow tight coupling between power transfer coils and between communication antennas while allowing these to be overlapping and potentially have a common axis. The approach may in many embodiments provide improved communication and/or improved power transfer. The approach may reduce or mitigate the impact of the power transfer coil on the communication operation and on the electromagnetic signal used for communication. The approach may achieve a separation between the communication antenna and the power transfer coil during communication without introducing an unacceptable degradation of the power transfer. In many embodiments, the impact of the power transfer coil on the communication may be substantially reduced while only a negligible effect on power transfer is introduced.

The magnetic shielding element may be arranged to operate in a saturated mode during power transfer intervals and in a non-saturated mode during communication time intervals by having a saturation point corresponding to a magnetic field strength higher than generated by communication antenna during the communication time intervals and lower than generated by the power transfer coil during the power transfer time intervals. The saturation point may be for a magnetic field strength higher than a maximum field strength generated in the magnetic shielding element during communication time intervals but lower than a (minimum) field strength generated in the magnetic shielding element during power transfer time intervals. In many embodiments, the operation is achieved by designing a magnetic shielding element to have a saturation point in the range from 100 mT to 1 T, and often in the range from 200 mT to 400 mT.

A saturation point for the magnetic shielding element may be a field strength in the magnetic shielding element for which the permeability is reduced to $1/10^{th}$ of the permeability for a magnetic field strength of 0T.

The magnetic shield material may typically be considered saturated if the field strength is above the saturation point and not saturated if the field strength is below the saturation point.

The communication antenna may overlap the power coil such that at least part of the communication antenna is between the power transfer coil of the device and the power transfer coil of the complementary device for a nominal/optimal spatial position of the two devices for power transfer. The power transfer coil may have a central axis, and may specifically have a substantially planar arrangement in a plane perpendicular to the axis. The communication antenna may overlap the power coil such that at least part of the communication antenna falls within a 3D figure formed by translating an area of power transfer coil in the direction of the axis (the 3D figure may be considered to have a constant cross section corresponding to the area of the power transfer coil and to extend along the axis).

The power transfer intervals and communication time intervals are typically non-overlapping.

The power transfer coil and the communication antenna are typically arranged such that the communication antenna is closer than the power transfer coil to a surface through which power transfer takes place. The arrangement is typically such that the communication antenna is positioned between the power transfer coil and a complementary power transfer coil of the complementary device during power transfer operation. The communication antenna may be positioned between the power transfer coil and a surface of the device for coupling to the complementary device.

The saturation point may correspond to a magnetic field strength (in the magnetic shielding element/material) higher than generated (in the magnetic shielding element/material) by the communication signal during the communication time intervals and lower than generated by the power transfer signal during the power transfer time intervals. Specifically, this may mean that the saturation point corresponds to a magnetic field strength higher than generated by the communication antenna during the communication time intervals and lower than generated by the power transfer coil during the power transfer time intervals.

In accordance with an optional feature of the invention, the magnetic shielding element is a sheet element having a thickness not exceeding 1 mm.

This may in many embodiments provide an efficient shielding effect yet allow compact dimensions and high coupling factors to be achieved.

In some embodiments, the sheet element may have a thickness not exceeding 0.5 mm, 2 mm, or 5 mm.

In accordance with an optional feature of the invention, the magnetic shield material is a ferrite material.

This may provide particularly advantageous operation and performance in many embodiments.

In accordance with an optional feature of the invention, the device is the power receiver and the complementary device is the power transmitter.

The approach may provide an improved power receiver in many embodiments.

In accordance with an optional feature of the invention, the device is the power transmitter and the complementary device is the power receiver.

The approach may provide an improved power transmitter in many embodiments.

In accordance with an optional feature of the invention, the communication antenna is a planar antenna having an area of no less than 30 cm$^2$.

This may provide improved performance in many embodiments and may for example provide increased flexibility in the positioning of the power receiver relative to the power transmitter. The approach may provide efficient implementation in many embodiments.

In some embodiments, the planar antenna has an area of no less than 20 cm$^2$, 50 cm$^2$, or even 100 cm$^2$.

In accordance with an optional feature of the invention, an area of the power transfer coil is no less than 50 cm$^2$.

This may provide improved performance in many embodiments and may for example support higher power transfer power levels. The approach may provide efficient implementation in many embodiments.

In some embodiments, the planar antenna has an area of no less than 70 cm², 100 cm², or even 250 cm².

In accordance with an optional feature of the invention, the communication antenna and the power transfer coil are planar coils.

This may provide improved performance and/or implementation.

In accordance with an optional feature of the invention, the communication antenna and the power transfer coil are co-axial.

This may provide improved performance and/or implementation.

In accordance with an optional feature of the invention, the saturation point corresponds to a magnetic field strength higher than generated by the communication antenna during the communication time intervals and lower than generated by the power transfer coil during the power transfer time intervals.

This may provide improved performance and/or implementation in many embodiments.

In accordance with an optional feature of the invention, the power transfer intervals and the communication time intervals are disjoint.

This may provide particularly advantageous performance.

In accordance with an optional feature of the invention, a saturation point for the magnetic shield element is in a range from 100 mT to 1 T.

This may provide particularly efficient operation in many embodiments and may specifically in many embodiments mean that the magnetic shield material is arranged to operate in a saturated mode during power transfer intervals and in a non-saturated mode during communication time intervals.

In accordance with an optional feature of the invention, a saturation point for the magnetic shield element is in a range from 200 mT to 400 mT.

This may provide particularly efficient operation in many embodiments and may specifically in many embodiments mean that the magnetic shield material is arranged to operate in a saturated mode during power transfer intervals and in a non-saturated mode during communication time intervals.

In accordance with an optional feature of the invention, there is provided wireless power transfer system comprising: a power transmitter comprising: a first power transfer coil for generating a power transfer signal for transferring power to a power receiver; a first communication antenna for communicating with the power receiver via a communication signal, the first communication antenna overlapping the first power transfer coil; a first magnetic shielding element positioned between the first power transfer coil and the first communication antenna; a first controller for controlling the power transmitter to perform power transfer during power transfer intervals and communication during communication time intervals; and a power receiver comprising: a second power transfer coil for receiving or generating the power transfer signal; a second communication antenna for communicating with the power transmitter via the communication signal, the second communication antenna overlapping the second power transfer coil; a second magnetic shielding element positioned between the second power transfer coil and the second communication antenna; a second controller for controlling the power receiver to perform power transfer during the power transfer intervals and communication during the communication time intervals; wherein the first power transfer coil and the first communication antenna are arranged such that the first communication antenna is positioned between the first power transfer coil and the second power transfer coil during power transfer operation; the second power transfer coil and the second communication antenna are arranged such that the second communication antenna is positioned between the first power transfer coil and the second power transfer coil during power transfer operation; the first magnetic shielding element comprises a first magnetic shield material having a first saturation point such that it operates in a saturated mode during the power transfer intervals and in a non-saturated mode during the communication time intervals, the first saturation point corresponding to a magnetic field strength higher than generated by the first communication antenna during the communication time intervals and lower than generated by the first power transfer coil during the power transfer time intervals; and the second magnetic shielding element comprises a second magnetic shield material having a second saturation point such that it operates in a saturated mode during the power transfer intervals and in a non-saturated mode during the communication time intervals, the second saturation point corresponding to a magnetic field strength higher than generated by the first communication antenna during the communication time intervals and lower than generated by the first power transfer coil during the power transfer time intervals.

According to an aspect of the invention there is provided a method of operation for device for wireless power transfer from a power transmitter to a power receiver using an electromagnetic power transfer signal, the device being one of the power transmitter and the power receiver, the method comprising: a power transfer coil receiving or generating the power transfer signal; a communication antenna communicating with a complementary device being the other device of the power receiver and the power transmitter via a communication signal, the communication antenna overlapping the power transfer coil; providing a magnetic shielding element positioned between the power transfer coil and the communication antenna; a controller controlling the device to perform power transfer during power transfer intervals and communication during communication time intervals; wherein the magnetic shielding element comprises a magnetic shield material having a saturation point such that it operates in a saturated mode during power transfer intervals and in a non-saturated mode during communication time intervals; the saturation point corresponds to a magnetic field strength higher than generated by the communication signal during the communication time intervals and lower than generated by the power transfer signal during the power transfer time intervals; and the power transfer coil and the communication antenna are arranged such that the communication antenna is positioned between the power transfer coil and a power transfer coil of the complementary device during power transfer operation.

In accordance with the invention, there may be provided a power transmitter for performing wireless power transfer to a power receiver using an electromagnetic power transfer signal, the power transmitter comprising: a power transfer coil for generating the power transfer signal; a communication antenna for communicating with the power receiver via a communication signal, the communication antenna overlapping the power transfer coil; a magnetic shielding element positioned between the power transfer coil and the communication antenna; a controller for controlling the power transmitter to perform power transfer during power transfer intervals and communication during communication time intervals; wherein the magnetic shielding element comprises a magnetic shield material having a saturation point such that it operates in a saturated mode during power transfer intervals and in a non-saturated mode during communication time intervals; the saturation point corresponds to a magnetic field strength higher than generated by the communication signal/the communication anteann during the communication time intervals and lower than generated by the power transfer signal/the power transfer coil during the power transfer time intervals; and the power transfer coil and the communication antenna are arranged such that the communication antenna is positioned between the power transfer coil and a power transfer coil of the power receiver during power transfer operation.

In accordance with the invention, there may be provided a power receiver for wireless power transfer from a power transmitter using an electromagnetic power transfer signal, the power receiver comprising: a power transfer coil for receiving the power transfer signal; a communication antenna for communicating with the power transmitter via a communication signal, the communication antenna overlapping the power transfer coil; a magnetic shielding element positioned between the power transfer coil and the communication antenna; a controller for controlling the device to perform power transfer during power transfer intervals and communication during communication time intervals; wherein the magnetic shielding element comprises a magnetic shield material having a saturation point such that it operates in a saturated mode during power transfer intervals and in a non-saturated mode during communication time intervals; the saturation point corresponds to a magnetic field strength higher than generated by the communication signal/a communication antenna of the power transmitter during the communication time intervals and lower than generated by the power transfer signal/a power transfer coil of the power transmitter during the power transfer time intervals; and the power transfer coil and the communication antenna are arranged such that the communication antenna is positioned between the power transfer coil and a power transfer coil of the power transmitter during power transfer operation.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
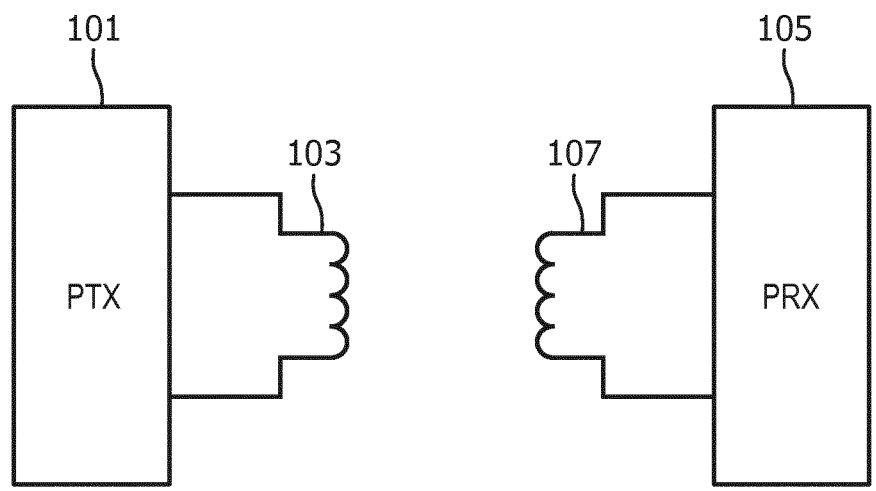
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter power transfer coil/inductor 103. The system further comprises a power receiver 105 which includes (or is coupled to) a receiver power transfer coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receiver power transfer coil 107, no power will be extracted by the power receiver from the generated electromagnetic field (apart from losses). In such a scenario, the driving of the transmitter power transfer coil 103 may generate an electromagnetic field of potentially high field strength but the power level of the power transfer signal will be zero (apart from losses).

The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter power transfer coil 103 and the receiver power transfer coil 107 are loosely coupled and thus the receiver power transfer coil 107 picks up (at least part of) the power transfer signal from the power transmitter 101. Thus, the power is transferred from the power transmitter 101 to the power receiver 105 via a wireless inductive coupling from the transmitter power transfer coil 103 to the receiver power transfer coil 107. The term power transfer signal is mainly used to refer to the inductive signal/magnetic field between the transmitter power transfer coil 103 and the receiver power transfer coil 107 (the magnetic flux signal), but it will be appreciated that by equivalence it may also be considered and used as a reference to an electrical signal provided to the transmitter power transfer coil 103 or picked up by the receiver power transfer coil 107.

In the example, the power receiver 105 is specifically a power receiver that receives power via the receiver power transfer coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high-power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In order to have optimal performance in a wireless power transfer system such as that of FIG. 1, it is desirable for the power transfer coils 103, 107 of the power transmitter 101 and the power receiver 105 to be closely aligned such that they share the maximum amount of magnetic flux. It is therefore desirable for the coils 103, 107 to be geometrically aligned in order to maximize the coupling factor ($\kappa$) between the transmitter and receiver coils.

Figure 2:
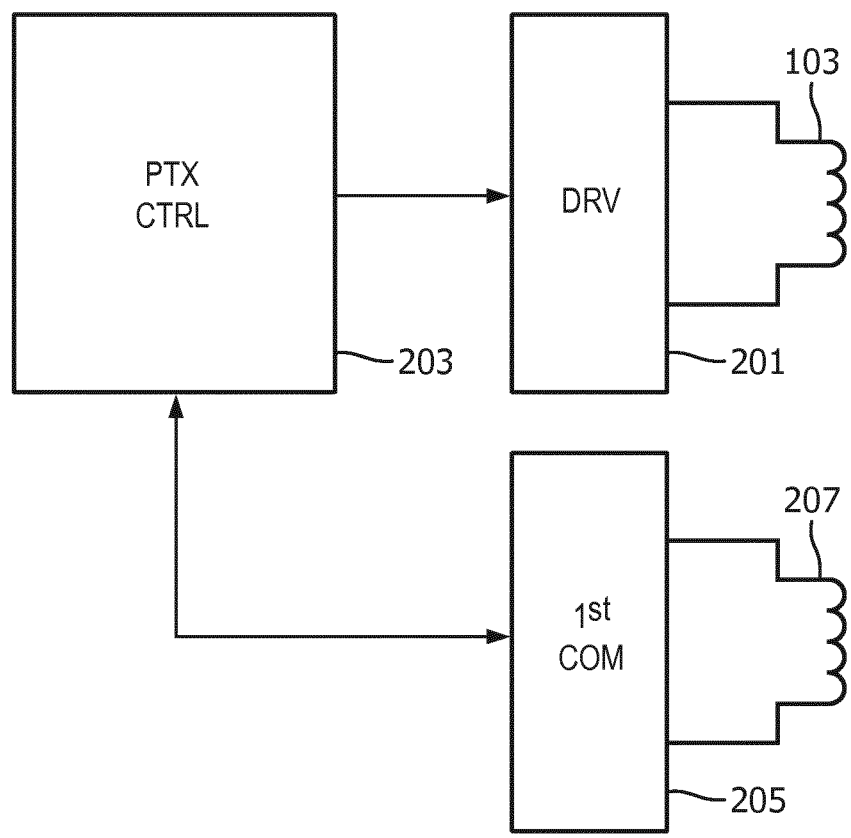
FIG. 2 illustrates an example of elements of a power transmitter in accordance with some embodiments of the invention.
Figure 3:
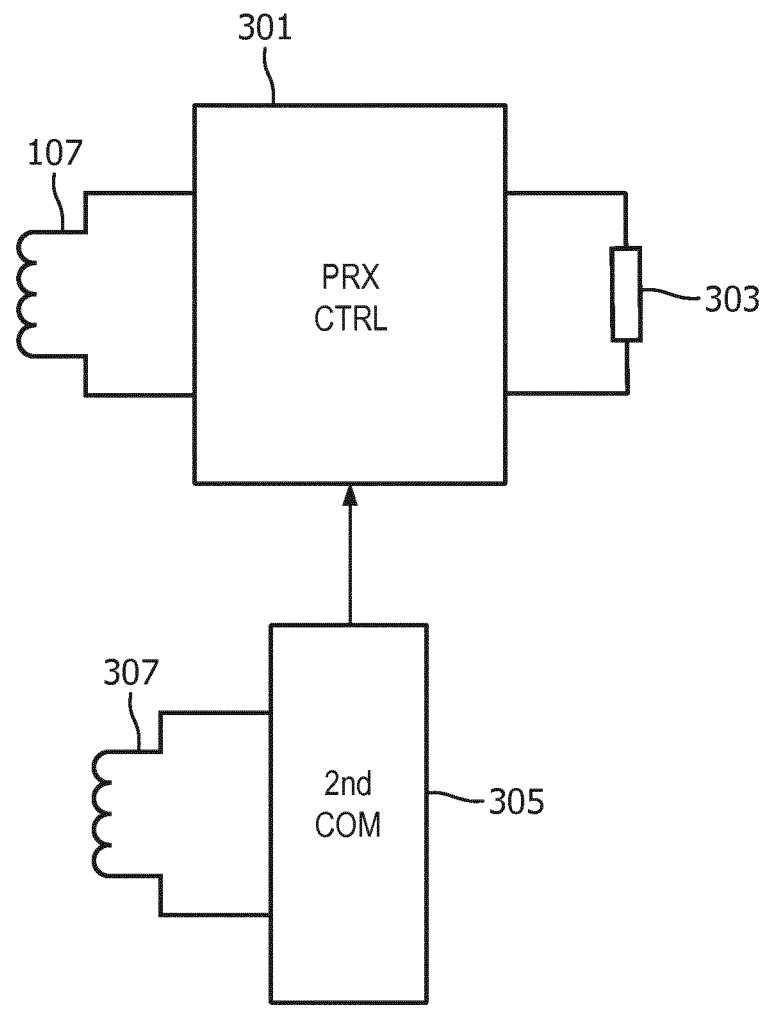
FIG. 3 illustrates an example of elements of a power receiver in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter power transfer coil 103 which in return generates an electromagnetic field and thus the electromagnetic power transfer signal which provides power transfer to the power receiver 105. The power transfer signal is provided (at least) during a power transfer phase.

The driver 201 may typically comprise an output circuit in the form of an inverter, typically formed by driving a full or half bridge as will be well known to the skilled person.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal/electromagnetic field. The power transmitter controller 203 comprises a power loop controller controlling a power level of the power transfer signal in response to power control messages received from the power receiver 105 during the power control phase.

In order to receive data and messages from the power receiver 105, the power transmitter 101 comprises a first communicator 205 which is arranged to receive data and messages from the power receiver 105 (as will be appreciated by the skilled person, a data message may provide one or more bits of information).

The first communicator 205 is coupled to a first communication antenna, which in the example is a first communication coil 207, and the communication between the power transmitter and the power receiver is performed using this dedicated communication antenna. Thus, the communication is separated from the power transfer in that different means and inductors& antennas are used for the power transfer and for the communication.

It will be appreciated that different types of communication antennas may be used in different embodiments depending on the specific characteristics. However, in many embodiments, the communication antennas of both the power transmitter and the power receiver are implemented as communication coils, which are typically planar communication coils. Accordingly, the following description will focus on communication antennas in the form of communication coils, and the communication antennas, will specifically be referred to as communication coils. However, it will be appreciated that this is merely exemplary and that other forms of antennas may be used.

In the system of FIGS. 1-3, the communication may be performed via a separate communication channel implemented using a separate communication coil. The use of a separate and dedicated communication system means that the communication and the power transfer functionality and operation can be individually optimized for their specific purpose. For example, the properties of the transmitter power transfer coil 103 and the first communication coil 207 can be individually optimized for transferring high levels of power and for efficiently communicating data respectively. Similarly, the signals used for the different functions may be individually optimized. As an example, efficient power transfer may often be achieved for signals having relatively low frequencies in the range from e.g. 20 kHz to 500 kHz whereas efficient short range communication may often be achieved for much higher frequencies, such as e.g. above 10 MHz or indeed much higher.

As a specific example, the communication may be implemented using a short range communication system such as NFC or RFID communication systems. Such communication approaches use a frequency of 13.56 MHz and the first communication coil 207 and the first communicator 205 may be arranged to communicate using carriers having this frequency and following the specific NFC or RFID Standards.

The use of a separate communication system may provide a number of advantages. For example, NFC may provide advantages including:
Very short latency
A one to one physical relation between power receiver and power transmitter.
It can be used to powerup/startup electronics (no batteries required, the power can be extracted from the communication carrier).

FIG. 3 illustrates some exemplary elements of the power receiver 105.

The receiver power transfer coil 107 is coupled to a power receiver controller 301 which couples the receiver power transfer coil 107 to a load 303. The power receiver controller 301 includes a power control path which converts the power extracted by the receiver power transfer coil 107 into a suitable supply for the load 303. In addition, the power receiver controller 301 may include various power receiver controller functionality required to perform power transfer, and in particular functions required to perform power transfer in accordance with the Qi specifications.

In order to support communication from the power receiver 105 to the power transmitter 101 the power receiver 105 comprises a second communicator 305.

The second communicator 305 is arranged to communicate with the power transmitter 101 using a communication approach which is separate from the power transfer as previously described with reference to the power transmitter 101. For example, the second communicator 305 may be arranged to communicate with the first communicator 205 using an NFC communication approach.

The second communicator 305 is coupled to a second communication antenna which as mentioned in the specific example is a second communication coil 307. The second communication coil 307 is coupled to the first communication coil 207 of the power transmitter such that communication can be exchanged via these communication coils 207, 307.

The second communicator 305 and second communication coil 307 may thus support communication using the same communication approach as the first communicator 205 and the first communication coil 207 thereby enabling communication separate from the power transfer. Specifically, the communication uses a short range communication such as NFC communication.

In some embodiments, different communication approaches may be used from the power transmitter to the power receiver and from the power receiver to the power transmitter. For example, the first communication coil 207 may only be used for communication in one direction whereas communication in the reverse direction may be performed by modulating the power transfer signal. For example, the power receiver 105 may be arranged to load modulate the power transfer signal generated by the transmitter power transfer coil 103, and the first communicator 205 may arranged to sense variations in the voltage and/or current of the transmitter power transfer coil 103 and to demodulate the load modulation based on these. The skilled person will be aware of the principles of load modulation, as e.g. used in Qi wireless power transfer systems, and therefore these will not be described in further detail. At the same time, the first communicator 205 may generate and modulate a carrier for transmission using the first communication coil 207. For example, the power transmitter may transmit data using NFC communication. In other embodiments, the power transmitter may modulate the power transfer signal to transmit data and the power receiver may transmit data using e.g. NFC communication. However, in most embodiments, a separate communication system using separate communication coils may be used for bilateral communication both to and from the power transmitter.

As mentioned, separating the communication and power transfer functions provide a number of advantages including allowing individual optimization. However, an issue associated with such an approach is that it is typically important to ensure that the different systems do not interfere with each other, either by the implemented functionality or the operations having a detrimental impact on each other.

One approach for isolating the functions from each other is to use substantially different frequencies for power transfer and communication. In many embodiments, the power transfer may specifically use a power transfer signal having a frequency in the 20 kHz-200 kHz range whereas the communication uses a carrier of over 10 MHz, such as specifically the NFC carrier frequency of 13.56 MHz.

However, even with such substantial frequency difference, undesired interference between the functions may still occur, especially in scenarios where the power transfer is at very high power levels where the communication is at low frequencies. Indeed, in scenarios such as when cordless kitchen appliances are powered by transferring power wirelessly from a large transmitter power transfer coil to a large receiver coil, the transmitter power transfer coil may be driven by an inverter that can deliver up to 2.5 kW of power to the resonant circuit that includes the transmitter power transfer coil. Even in the case where the communication is performed at a much higher frequency, the power transfer signal may provide a substantial interference and may also e.g. cause saturation effects etc.

Figure 4:
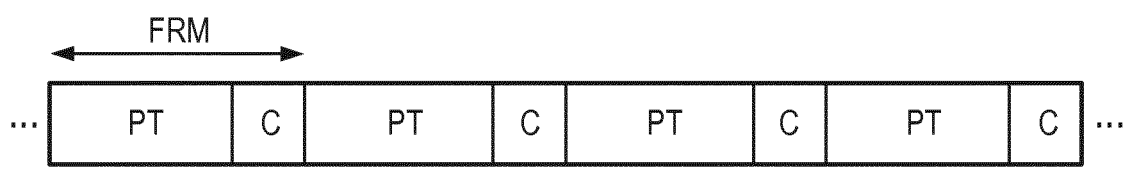
FIG. 4 illustrates an example of a time frame for a power transfer system in accordance with some embodiments of the invention.

In the system of FIGS. 1-3, a time division approach is applied where power transfer and communication are performed in different time intervals. Specifically, the first communicator 205 and the second communicator 305 are arranged to control respectively the power transmitter and the power receiver to perform power transfer during power transfer intervals and communication during communication time intervals, where the power transfer intervals and communication time intervals are typically disjoint and specifically non-overlapping. An example of the approach is shown in FIG. 4 where a repeating time frame comprises a power transfer interval PT in which power transfer is performed (and no communication) and a communication time interval C in which communication is performed (and no power transfer). Thus, in the example, a time frame is divided into power transfer intervals/time slots in which the power transfer signal is generated but typically no communication signal is generated, and communication intervals/time slots in which no power transfer signal is generated and communication is performed (a communication signal is generated). In the example, the transmitter power transfer coil 103 and the receiver power transfer coil 107 are active during the power transfer intervals and the first communication coil 207 and the second communication coil 307 are active during communication intervals.

It will be appreciated that in some embodiments, the time intervals may have dynamically varying durations and that the time frame may have a dynamically varying duration. For example, in some embodiments, the communication interval may not be terminated until the currently pending data has all been transmitted. It will also be appreciated that the time frame may include other time intervals in which other operations or combinations are performed (for example, the time frame may e.g. include combined time slots in which both power transfer and communication (e.g. non-critical communication is performed).

The separation of power transfer and communication in the time domain may provide a particularly efficient separation of the impact of one operation on the other, and specifically the interference caused by the power transfer signal on the communication may be reduced or eliminated completely. However, even in this case the separate communication and power transfer functions may have an impact on each other. In particular, the functionality required to support the functions may have an impact. Specifically, the presence of both a power transfer coil and an antenna coil may have an impact. Indeed, the presence of the communication coils may influence the positioning and resulting distance between the power transfer coils. Similarly, the presence of often large power transfer coils may have significant impact on the communication electromagnetic field and signal. Therefore, the specific construction and design of the different functionalities is a critical challenge to address.

The problem is exacerbated by the fact that both the power transfer coils and the communication coils have the same requirement in that they should be positioned so that the coupling is maximized and the sensitivity to positioning/alignment is minimized. For example, off center positions of the power transfer coils or the communication coils will introduce a sensitivity to not only the position but also the orientation/rotation of the devices relative to each other thereby introducing additional constraints that are impractical to the user.

Indeed, in addition to supporting communication, the communication coils may also provide a small amount of power to the power receiver to support internal electronics and specifically communication functionality (e.g. prior to power transfer when no power is provided by a power transfer signal or during communication intervals if no power storage is implemented in the power receiver). This means that a good coupling between the communication coils is required. However, the coupling between the communication coils and the impedance of the coils is negatively influenced by the proximity of the typically large power transfer coils.

In many embodiments, the power transfer coil and the communication coil of a device (the power transmitter or the power receiver) are coaxial. The coils have common center axis around which they are distributed. The communication coil may for example be positioned on top of the power transfer coil (or vice versa). The coils may be rotationally invariant around an axis, and specifically around the same axis. In such cases, when the power receiver is optimally positioned with respect to the power transmitter, and specifically when it is positioned such that the axis of the power transmitter coils and the axis of the power receiver coils coincide, both the communication coils and the power transfer coils will overlap maximally resulting in a maximization of the coupling between respectively the communication coils and the power transfer coils. Thus, when the power receiver is optimally placed for power transfer it will also be optimally placed for communication, and furthermore the situation will be substantially independent of the orientation of the power receiver. In many embodiments, the power transfer coils may be substantially circular or spiral planar coils around a central axis. Similarly, the communication coils may be substantially circular or spiral planar coils around a central axis, which specially for a communication coil of a device is substantially the same axis as for the power transfer coil of the device.

Figure 5:
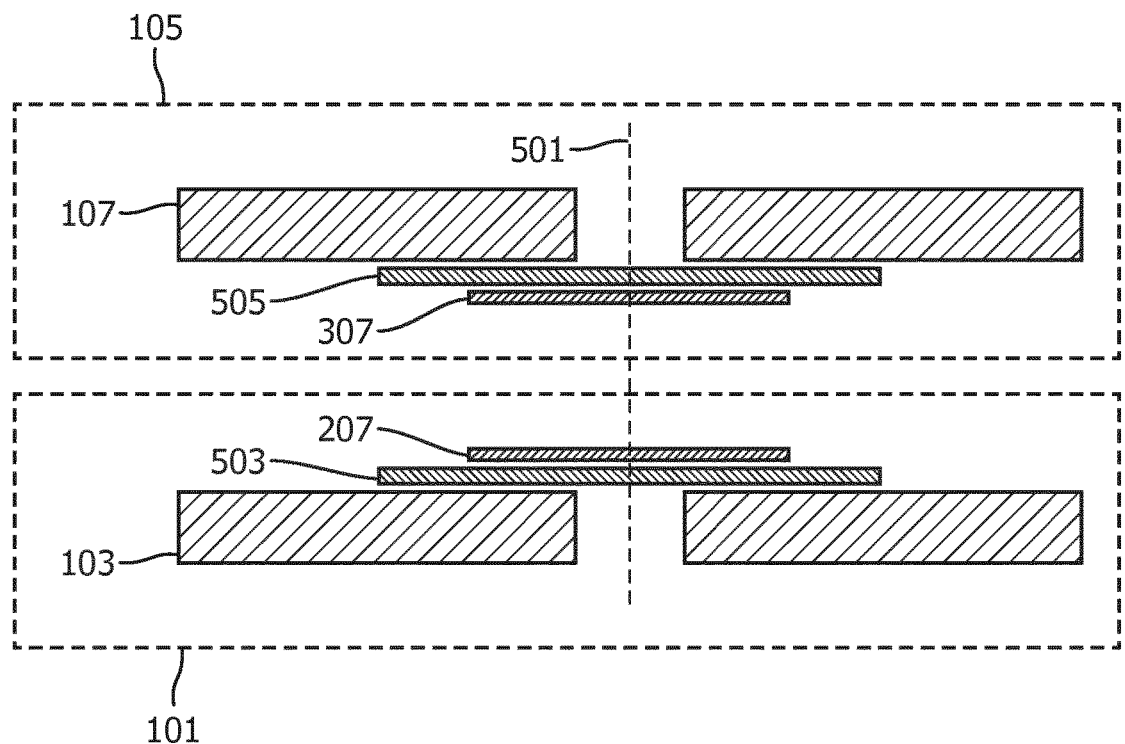
FIG. 5 illustrates an example of coil arrangements for a power transfer system in accordance with some embodiments of the invention.

FIG. 5 illustrates a cross section of such an arrangement for both a power transmitter and a power receiver where the devices are positioned in a(n optimal) configuration for power transfer. In the example, the power receiver 105 is positioned on top of the power transmitter 101.

The power transmitter 101 comprises the transmitter power transfer coil 103 for generating the power transfer signal. In the example of FIG. 5, the transmitter power transfer coil 103 is illustrated by two areas reflecting the cross section of the area comprising the windings and reflecting that a center area is free of windings.

The first communication coil 207 is positioned on top of the transmitter power transfer coil 103 towards the power receiver 105. FIG. 5 illustrates a typical example where the communication coil is substantially smaller than the transmitter power transfer coil 103. Further, in the example of FIG. 5 the windings of the first communication coil 207 also fill the center area.

The transmitter power transfer coil 103 and the first communication coil 207 are coaxial and symmetrically distributed around a center axis 501. They are also substantially invariant to rotation around the center axis 501.

Similarly, the power receiver 105 comprises the receiver power transfer coil 107 for receiving the power transfer signal. In the example of FIG. 5, the receiver power transfer coil 107 is illustrated by two areas reflecting the cross section of the area comprising the windings and reflecting that a center area is free of windings.

The second communication coil 307 is positioned below the receiver power transfer coil 107 towards the power transmitter 101. FIG. 5 illustrates a typical example where the communication coil is substantially smaller than the receiver power transfer coil 107. Further, in the example of FIG. 5 the windings of the second communication coil 307 also fill the center area.

The receiver power transfer coil 107 and the second communication coil 307 are coaxial and symmetrically distributed around a center axis 501 which specifically is the same as the center axis for the power transmitter 101 (reflecting optimal positioning of the power receiver 105 on the power transmitter 101). They are also substantially invariant to rotation around the center axis 501.

Although FIG. 5 illustrates an example where the power receiver is optimally placed with respect to the power transmitter such that the center axis 501 is common to both the coil arrangement for the power transmitter and for the power receiver, it will be appreciated that the power receiver will typically be placed with some misalignment and the center axis 501 will not completely line up for the power receiver to the power transmitter. However, it will be appreciated that whereas this may reduce the coupling by some amount, the approach and operation will still be applicable and will still provide the described advantages and benefits as long as the misalignment is not too large. The exact misalignment which is acceptable will depend on the specific preferences and requirements of the individual embodiment (as well as e.g. the dimensions of the coils).

The arrangement of FIG. 5 may specifically be for cordless kitchen appliances with two large power transfer coils 103, 107 being used to transmit power from the transmitter to the receiver. In between the power transfer coils 103, 107 the communication coils 207, 307 are placed.

The arrangement may provide a very good coupling between the communication coils 207, 307 as they will be positioned close to each other and furthermore with a large overlap when the power receiver is positioned suitably for power transfer. Further, a good coupling between the power transfer coils 103, 107 is achieved since the communication coils 207, 307 are thin and thus do not significantly increase the distance between the power coils.

However, an issue with such an arrangement is that even in the case of using time division between the communication and power transfer, the presence of the coils may have an impact on each other. Specifically, the large power transfer coils may have a significant impact on the performance of the communication, and specifically on the generated electromagnetic communication signal.

Specifically, the presence of the power transfer coils may affect the communication by losing part of the transmitted power in the power coils. The power transfer coils couple with the communication coils and absorb a part of the power. This acts like a damping to the communication. The power transfer coils (and its attached circuitry) can also add unwanted resonances in the communication system. One more effect is the change of communication antenna inductance and resistance when a power transfer coils is in the vicinity. As a result, the communication coil can detune (to a different resonance frequency) and will be able to transmit less power.

In the configurations of FIG. 5, a magnetic shielding element 503, 505 is positioned between the power coil and the communication antenna. Specifically, a first magnetic shielding element 503 is positioned between the transmitter power transfer coil 103 and the first communication coil 207 and a second magnetic shielding element 505 is positioned between the receiver power transfer coil 107 and the second communication coil 307. The magnetic shielding element may specifically be a thin shielding sheet which does not significantly increase the height of the arrangement (it does not substantially increase the distance between the power transfer coil and the communication coil).

In the arrangement of FIG. 5, the two communication coils 207, 307 are during the power transfer operation positioned such that they are the two closest coils, and specifically such that both communication coils 207, 307 are between the two power transfer coils 103, 107 during operation. For each of the devices, the power transfer coil and the communication coil are arranged such that the communication coil is closer than the power transfer coil to the surface through which power transfer takes place. The magnetic shielding element is positioned such that it is closer to the power transfer surface than the power transfer coil but further from the power transfer surface than the communication coil. The arrangement is typically such that the communication coil is positioned between the power transfer coil of the device itself (the power transmitter 101 or the power receiver 105) and the power transfer coil of the other device during power transfer operation. The communication coil is specifically positioned between the power transfer coil and the surface coupling to the other device.

The magnetic shielding element comprises a magnetic shield material which is arranged such that it has a saturation point which causes it to operate in a saturated mode during power transfer intervals and in a non-saturated mode during communication time intervals. Thus, the magnetic shield material is selected such that for the higher magnetic field strengths during the power transfer operation, saturation is reached whereas for the much lower field strengths during communication the magnetic shield material remains in its non-saturated mode. It will be appreciated that different materials may be used in different embodiments but in many embodiments the magnetic shield material may be ferrite and the magnetic shielding element may be a thin ferrite sheet. Thus, in many embodiments, a thin ferrite sheet is placed between the antenna and power coil (possibly on both the transmitter and receiver side although in many scenarios only the power receiver or the power transmitter may utilize such a magnetic shielding element).

When thin ferrite sheets are put in between the communication coil and the power transfer coil, the communication coil is much less influenced by the power transfer coils. The ferrite material has a high permeability µ for low magnetic field strengths as experienced during communication and is accordingly able to guide the flux of the communication signal away from the power transmitter coils (e.g. made of copper). The ferrite sheets may effectively create an artificial electromagnetic distance increase between the power transfer coil and communication coil during communication. This can be considered as a magnetic isolation of the communication coils from the conductive windings of the power coils.

However, during the power transfer time intervals, the magnetic field is much stronger and the ferrite will saturate. This will effectively render the effect of the magnetic shielding element insignificant and it will effectively have the same effects as air/vacuum. In other words, the effect of the magnetic shielding element will disappear, and the power transfer will proceed as if no magnetic shielding element is present.

Thus, in the approach, the magnetic shielding element may effectively behave like a switch and provide a very different effect and function during the communication time intervals than in the power transfer time intervals. This may provide the desired advantages of increasing isolation between the communication coil and the power transfer coil during the communication time intervals without detrimentally affecting the power transfer.

Figure 6:
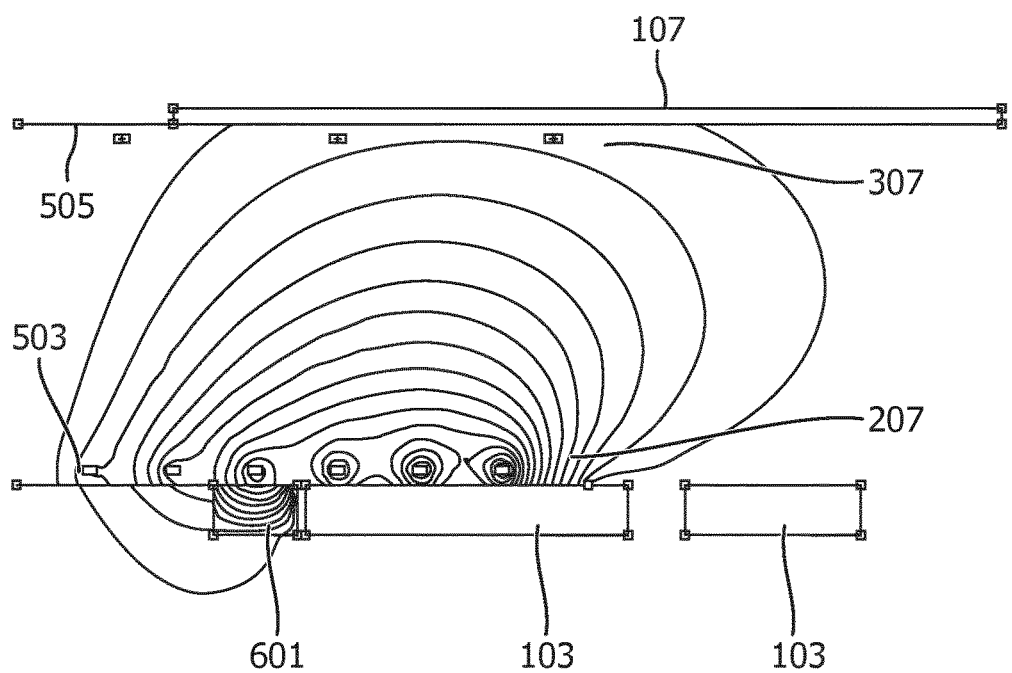
FIG. 6 illustrates an example of magnetic field distribution for a coil arrangement for a power transfer system in accordance with some embodiments of the invention.

The function during the communication intervals may be illustrated by FIG. 6. During such intervals, the first communication coil 207 generates a communication signal from which the power receiver may extract data as well as possibly power for operating some control functionality (specifically the communication). During this operation, the ferrite sheet acts as a shield between the communication coil and power transfer coil. The ferrite sheet will shield the communication coil from the power transfer coil and the negative effects of the vicinity of the power transfer coils on the communication coil are severely reduced.

As illustrated in FIG. 6, the field lines may be concentrated within the ferrite sheets resulting in much reduced impact of the power transfer coils. The flux lines are guided through the sheet and the copper planes of the power transfer coils are effectively shielded from the communication coils. It can also be seen that an effect is achieved both for the power receiver and the power transmitter with the flux lines being concentrated in the ferrite sheets and kept away from the windings of the power transfer coils. It should be noted that in the example of FIG. 6, a ferrite element 601 is positioned next to inner windings of the transmitter power transfer coil 103 and thus flux lines are also guided through this element (it will also be appreciated that the transmitter power transfer coil 103 may comprise outer windings not shown in FIG. 6).

During power transfer, the induced field is a lot stronger, and the shield will saturate immediately. When the shield is saturated it will behave like air and will have minimal influence on the power transfer over the power transfer coils.

In the specific example, ferrite sheets are positioned between NFC antennas/communication coils and power transfer coils resulting in the influence of the power transfer coils on the NFC antennas being at least partly shielded. This may influence the size of the appliance/coils since complete overlap of the power transfer coils and communication coils/antenna is now allowed. As a result, multiple benefits are possible:

Devices/appliances can be made smaller (the communication coil is in the same plane as the power coils)

Power transfer is more efficient. The power coils can be made larger, and placed closer to each other, and this increases the coupling between the coils.

There is no need to design a communication coil for every different coil setup. The effect from the power coils in the neighborhood of the antennas is minimized and accordingly the antenna design does not depend on the environment to the same extent (specifically it is less dependent on the properties of the power transfer coils).

Figure 7:
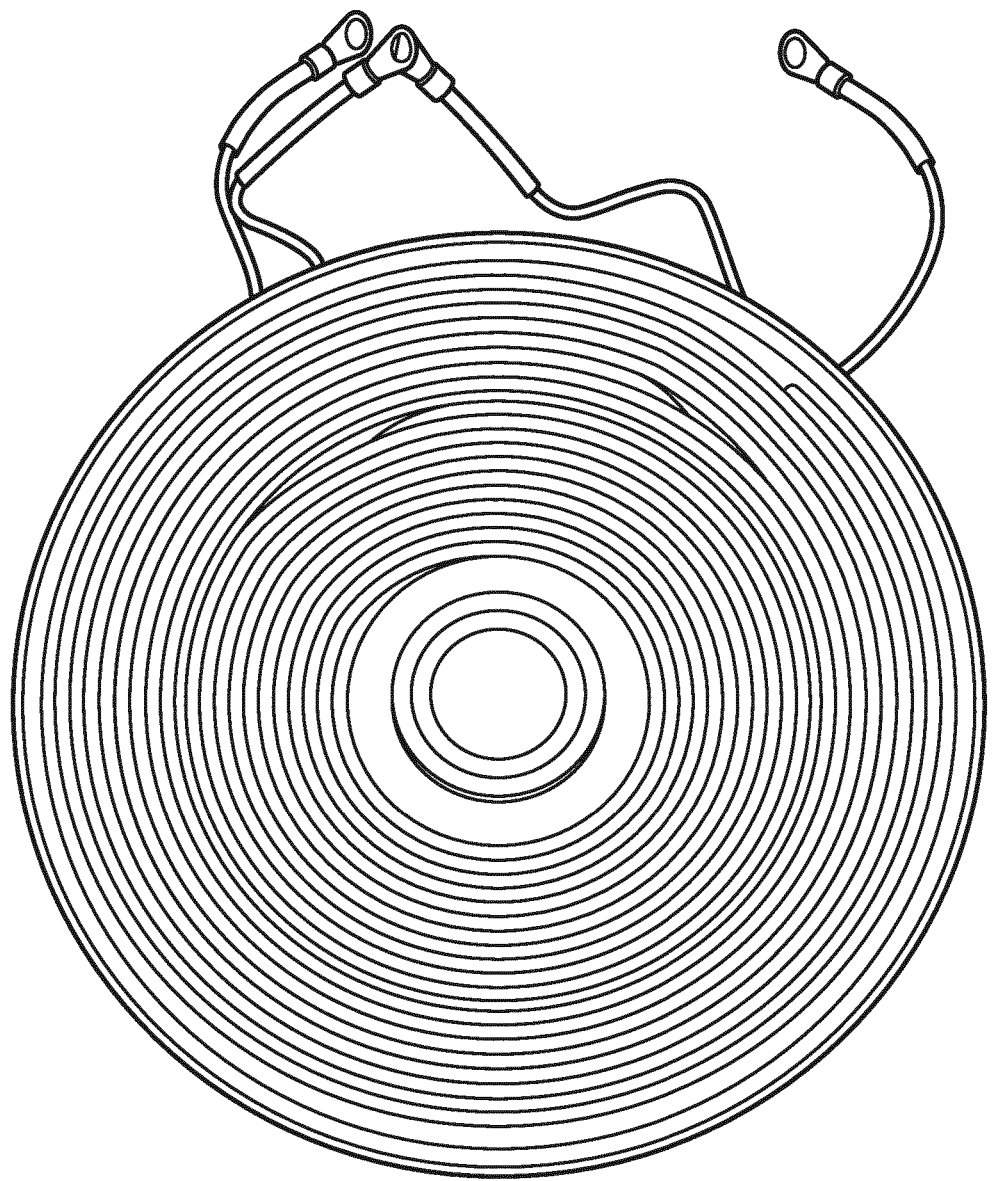
FIGS. 7-13 illustrate an exemplary prototype coil arrangement for a power transfer system in accordance with some embodiments of the invention.
Figure 8:
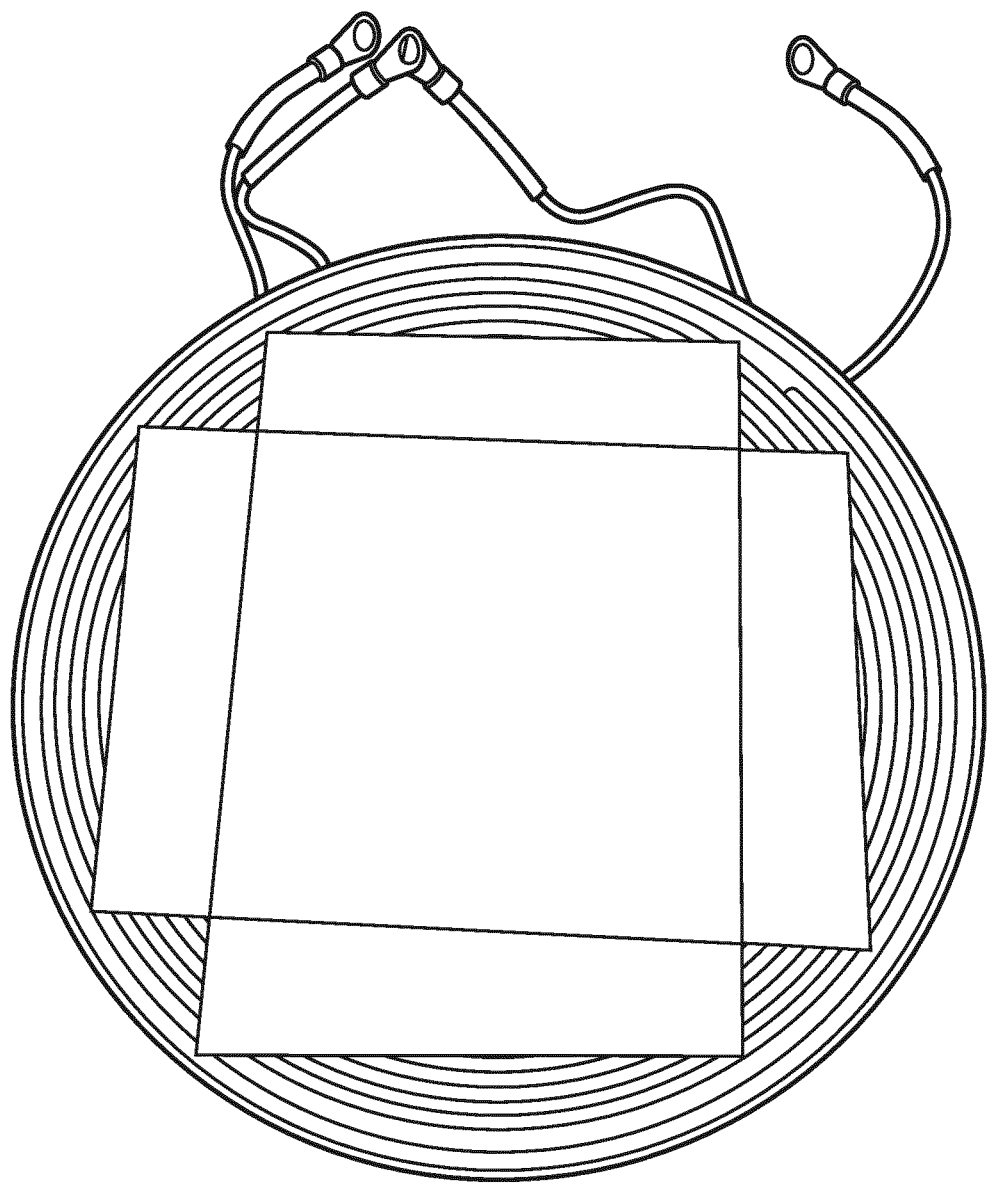
Figure 9:
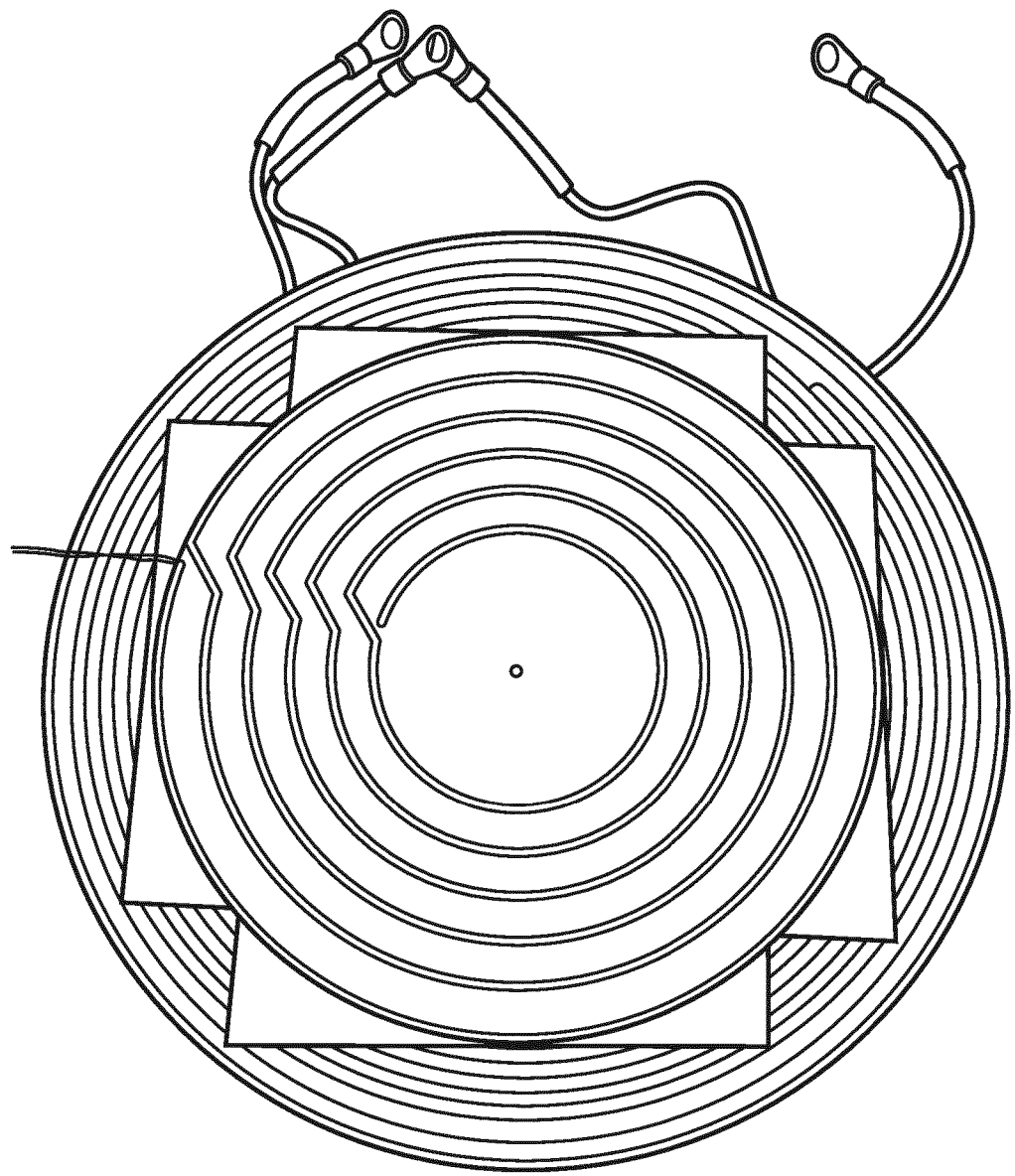
Figure 10:
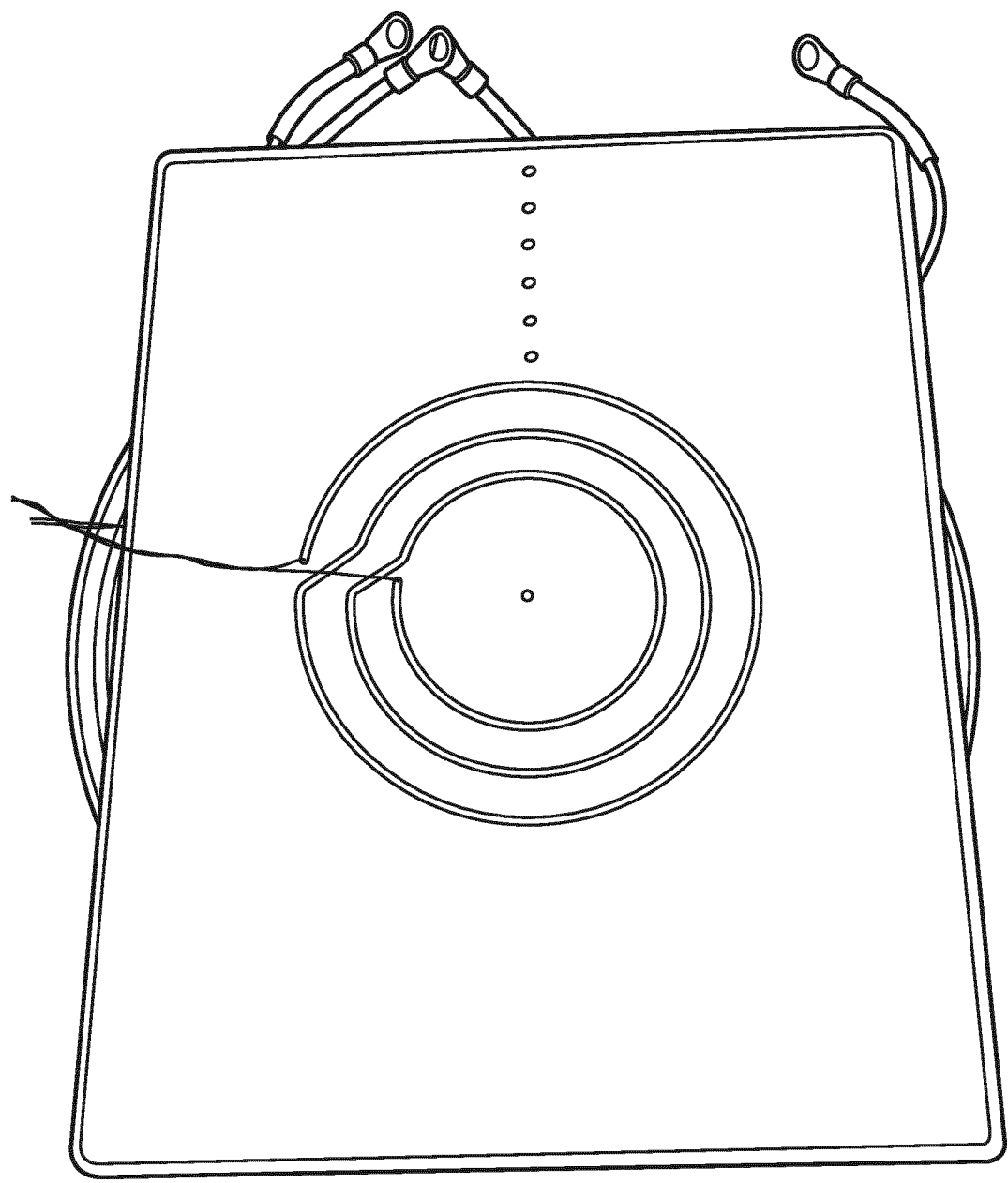
Figure 11:
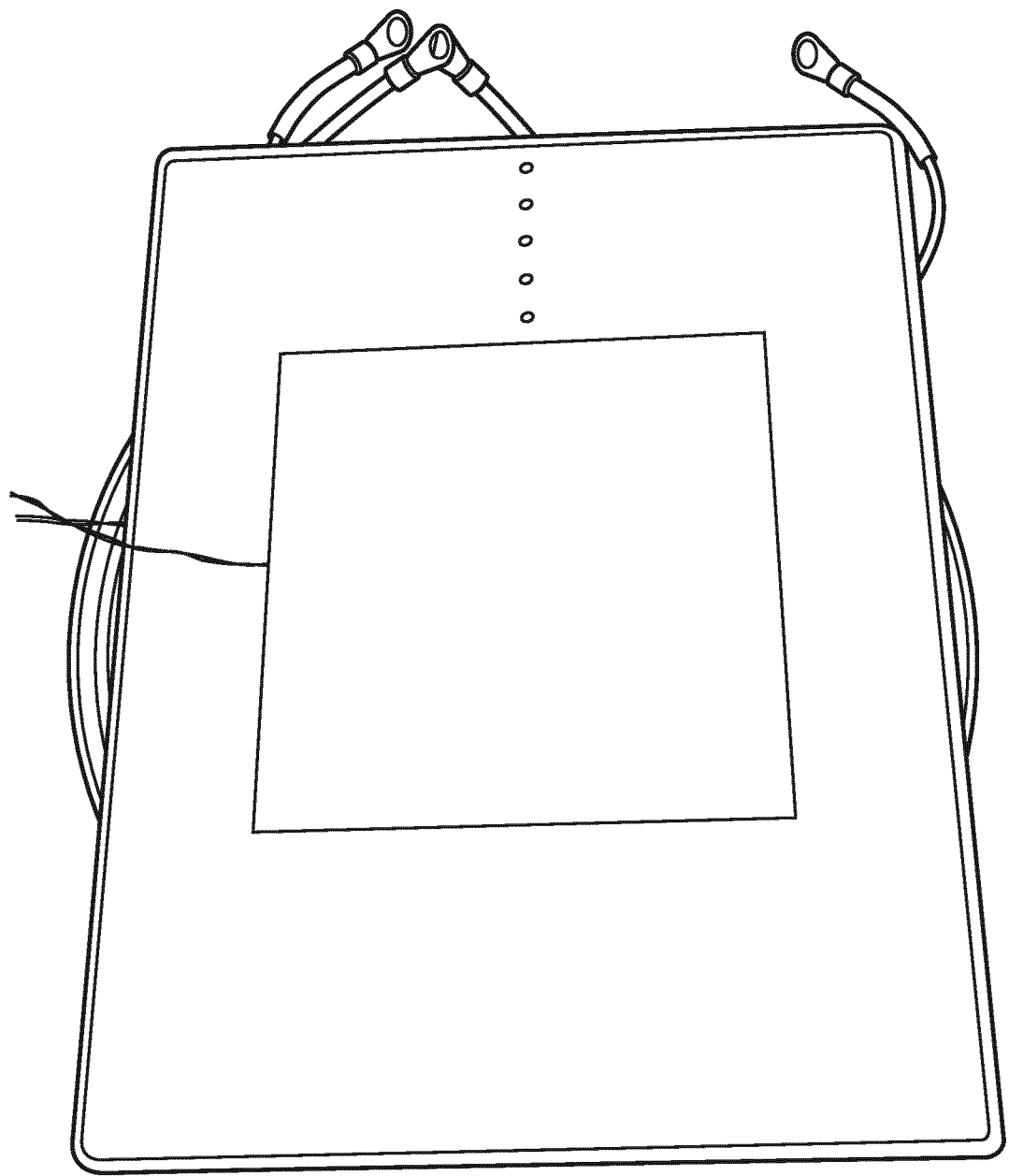
Figure 12:
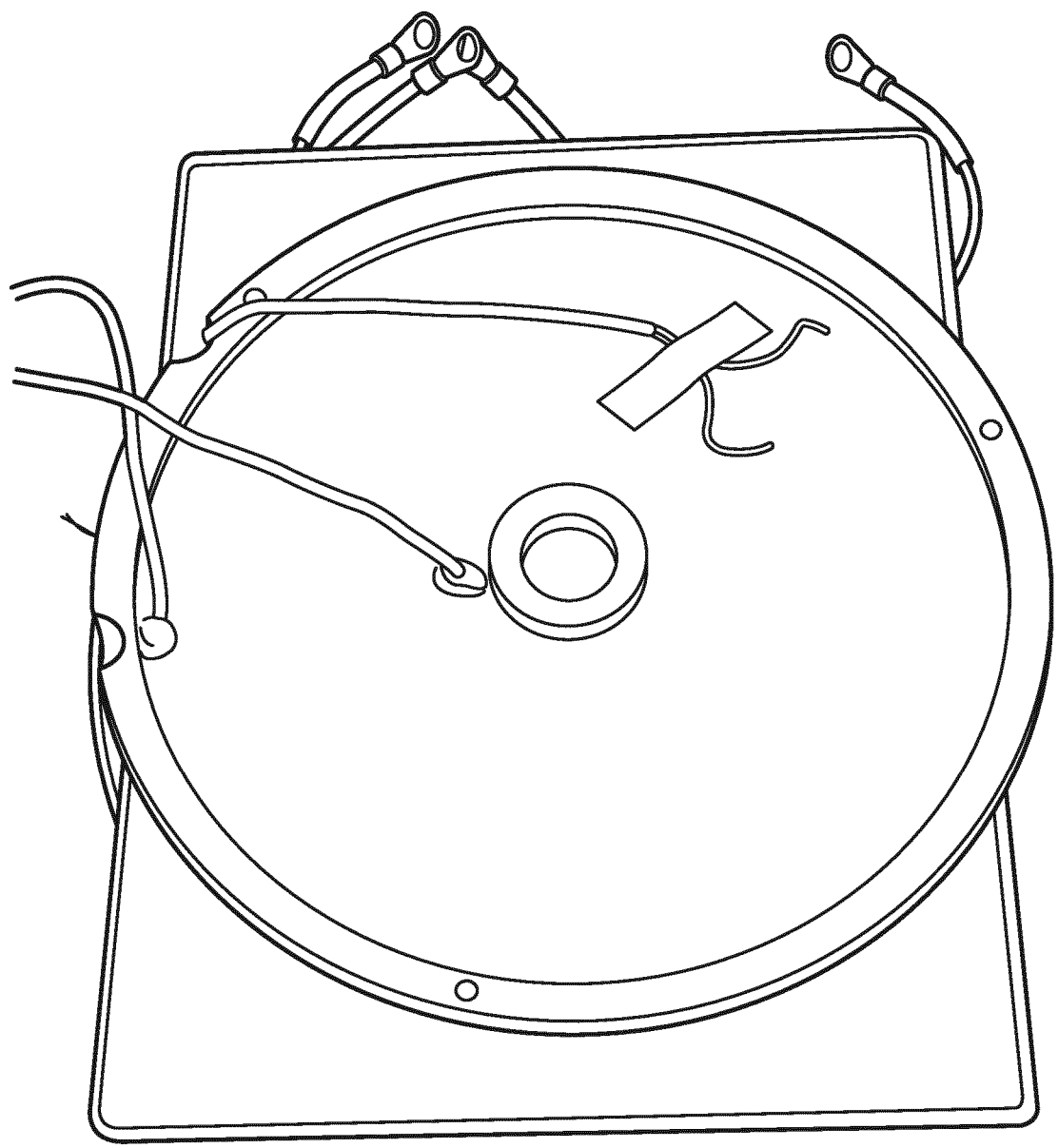
Figure 13:
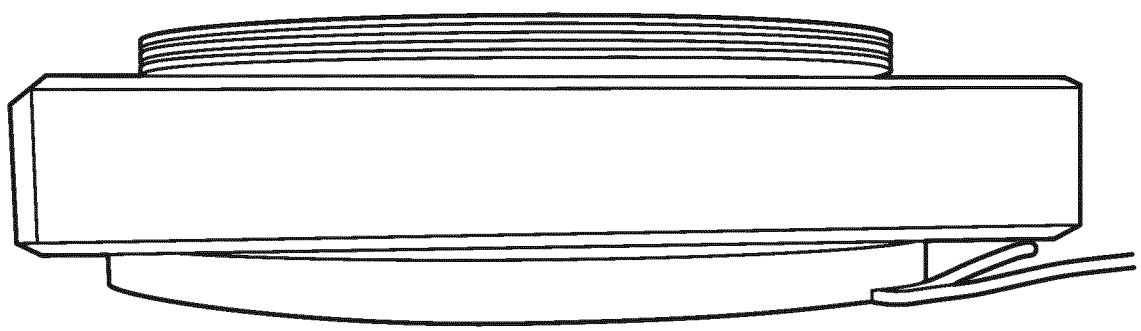

FIGS. 7-13 illustrate a possible build-up of an exemplary prototype arrangement in accordance with some of the described principles. FIG. 7 shows an example of a transmitter coil facing upwards. FIG. 8 shows a ferrite sheet placed on top of the transmitter coil. The ferrite itself is in the example facing upwards. In FIG. 9, the first communication coil 207 is placed on top of the ferrite sheet. The copper tracks of the first communication coil 207 are facing upwards. FIG. 10 shows the inclusion of a wooden spacer of 4 cm used to create the coil to coil distance (it emulates e.g. a worktop between the power transmitter and the power receiver). The second communication coil is placed on top of the wooden spacer with the copper tracks facing downwards. FIG. 11 shows the receiver ferrite sheet placed on top of the receiver antenna (upside down). FIG. 12 shows the power receiving coil being placed on top of the receiver ferrite sheet and FIG. 13 shows a side view of the complete stack. As can be seen, the communication coils and ferrite sheets only increase the power transfer coil-to-coil distance by a very small amount. Indeed, the communication coils and ferrite sheet may be made very thin such that they do not add much extra distance between the power transfer coils.

The specific characteristics of the magnetic shielding element and material may depend on the preferences and requirements of the individual embodiment.

In many embodiments, a thin magnetic shielding element may be used and typically it may have a thickness not exceeding 1 mm (or for some requirements not exceeding 0.5 mm, 2 mm or even 5 mm). This may in many embodiments provide an advantageous trade-off between the resulting distance between the power transfer coils and the magnetic shielding. It may typically, provide effective screening during communication without significantly impacting performance during power transfer.

Thus, whereas the magnetic shielding element may reduce the coupling between the power transfer coils, this may be kept to low levels by using very thin sheets to form the magnetic shielding element. This allows the influence of the sheets on the power transfer to be negligible while keeping the advantages for/during communication. When the sheets are thin, it may furthermore be more practical to implement a magnetic shielding element which operates in a saturated mode during power transfer and in a non-saturated mode during communication. The thickness of the sheet may specifically be designed such that the communication using the communication coils will not result in the magnetic shielding element being saturated by the antennas under any circumstances (e.g. maximum communication power). At the same time, the thickness may be designed to be sufficiently thin to allow it to be saturated during power transfer.

The specific material may also be selected and designed for as close to optimal performance as can reasonable by achieved. For example, the material may be selected to have as high permeability and low losses for the given communication carrier frequency.

Figure 14:
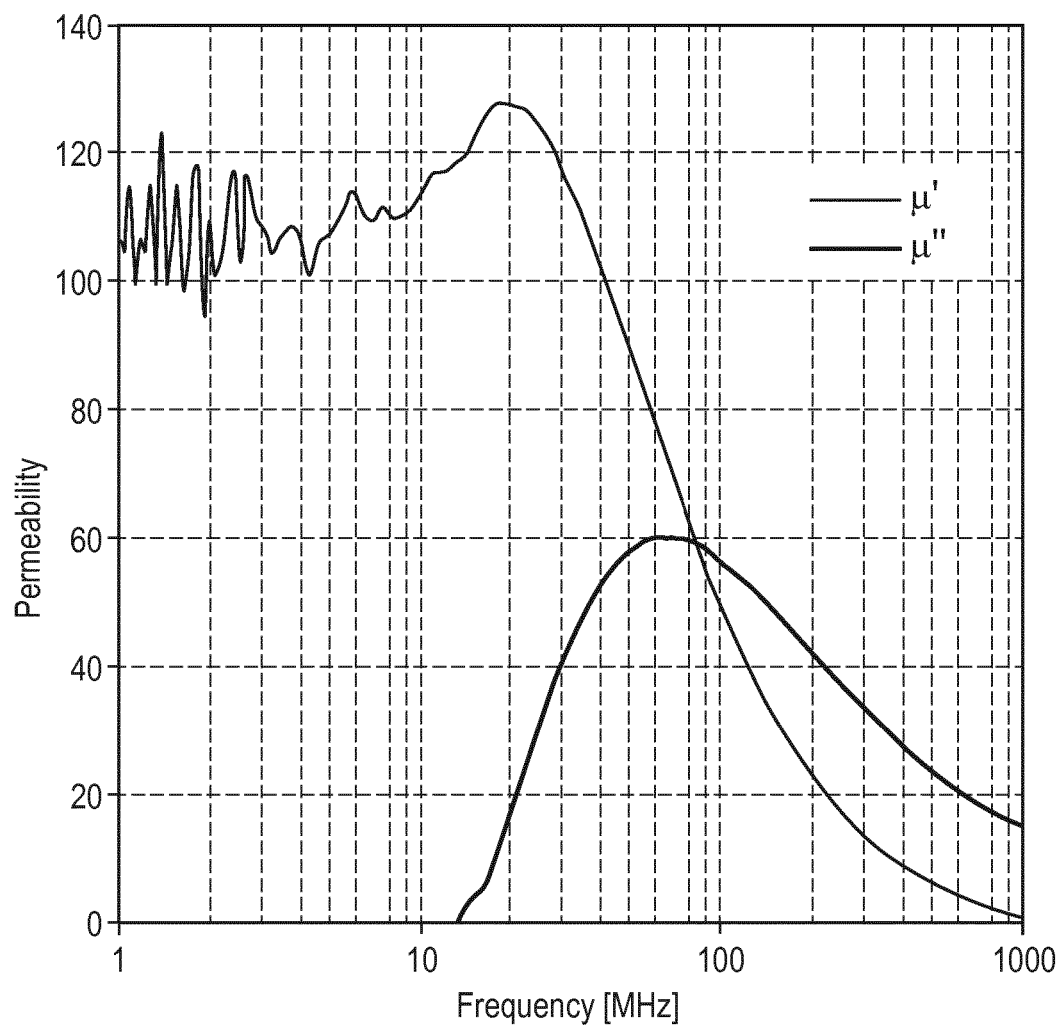
FIG. 14 illustrates some performance characteristics for a ferrite magnetic shielding layer.

For example, FIG. 14 illustrates an example of the permeability μ' and loss μ" for a ferrite material which is suitable for usage for NFC communication. NFC communication uses a carrier frequency of 13.56 MHz for which the permeability μ' is high and the loss μ" is low for the ferrite material of FIG. 14.

The specific magnetic field strength at which the ferrite material saturates may be different in different embodiments. The magnetic shielding element may be arranged to operate in the non-saturated mode for a power transfer level below e.g. 0.5 W, 1 W, 5 W, or 10 W (typically the power transfer level during the communication time intervals is zero but in some embodiments, a small amount of power may be transferred e.g. to support some electronic circuitry. However, the level is maintained to be below the saturation point for the magnetic shielding element).

Similarly, the magnetic shielding element may be arranged to operate in the saturated mode for a power transfer level above e.g. 0.5 W, 1 W, 5 W, or 10 W. The power level corresponding to the saturation point will typically be below a minimum power transfer level allowed or expected during normal power transfer.

Typically, the difference between the power levels/magnetic field strength generated during communication time intervals and during power transfer time intervals is substantially different. For example, typical power levels for NFC communication may be in the range of a few hundred mW whereas the power levels during power transfer may be in the range from 10 W and up, and indeed for e.g. kitchen appliances it may be substantially higher. It is thus typically possible to provide a magnetic shielding element which switches between the saturated and non-saturated modes in respectively the power transfer and communication time intervals with some margin.

In many embodiments, the saturation point for the magnetic shielding element may be for a magnetic field strength in the range of 100 mT to 1 T. A saturation point in this range typically provides a very efficient and reliable switch between non-saturated mode in the communication time intervals and saturated mode in the power transfer time intervals. The range typically provides such efficient switch for practical/typical power levels for typical communication and power transfer functions and operations. In many embodiments, particularly advantageous performance can be achieved for a saturation point for the magnetic shielding element being for a magnetic field strength in the range of 200 mT to 400 mT.

An advantage of the arrangement described is that it allows efficient operation and couplings to be achieved for large coils, and indeed it allows both large communication coils and large power transfer coils.

In many embodiments, the area of the communication coil is no less than 20 cm$^2$ (or possibly no less than 10 cm$^2$, 30 cm$^2$, 50 cm$^2$, 100 cm$^2$, for some uses). In many embodiments, the area of the power transfer is no less than 50 cm$^2$ (or possibly no less than 30 cm$^2$, 100 cm$^2$, 200 cm$^2$, 500 cm$^2$, for some uses). The area may be measured in the plane of planar coils/antennas. The area may be the area of the largest cross section of the coil/antenna.

The use of such large coils provides a number of advantages in many scenarios and embodiments. For example, it provides a large area of high magnetic field strength and therefore provides increased freedom in the placement of the power receiver. E.g. for communication coils having a diameter of 10 cm, the power receiver may be misplaced by up to 10 cm while still providing an overlap between the communication coils.

Also, a large power transfer coil typically allows an efficient design for higher power levels (more windings, thicker wires) and is thus particularly suitable for higher power levels such as those experienced in e.g. kitchen applications.

The previous description has focused on corresponding/symmetric implementations and arrangements in the power receiver and the power transmitter. However, it will be appreciated that this is not necessary or required for advantageous implementation. Indeed, the power transmitter and power receiver may have substantially different arrangements and coils/antennas while still allowing the described advantages to be produced. Indeed, in some embodiments, the described arrangement, and specifically the inclusion of the magnetic shielding element, may only be provided in either the power transmitter or the power receiver. Thus, it should be appreciated that the previous description of the coil/antenna configuration in the power transmitter is not reliant on any specific coil/antenna configuration at the power receiver, and similarly that the previous description of the coil/antenna configuration in the power receiver is not reliant on any specific coil/antenna configuration at the power transmitter. The described approach of using a magnetic shielding element is indeed applicable individually to both power transmitter and power receiver implementations.

The previous description of the communication antenna has focused on an implementation of this as a planer coil. Such coils are typically implemented as a planar spiral coil with a continuously increasing distance to the center axis. However, in many embodiments, the power receiver or power transmitter may use a communication coil which is formed by a set of interrupted concentric circular conductor elements connected by transition conductor elements having at least partly a radial direction, i.e. the direction of the transition conductor elements include a radial direction component. Thus, rather than continuously spiraling, the communication coil may be formed by circular elements which are connected by elements having a, typically substantial, radial direction.

Thus, in the example, each turn of the winding of the communication coil may be formed by a circular part which has a constant distance to the center axis and a transition part which connects circular parts of two adjacent turns. The transition part does not have a constant distance to the center axis but includes a radial component. Typically, the circular part may cover an angle of no less than 270°, and typically no less than 315°, 340°, or even 350°.

In many embodiments, the antenna may be arranged such that the circular conductor elements are equidistant with respect to each other. Thus, the distance from a given circular conductor element to the nearest neighbor(s) may be constant for different circular conductor elements. In many embodiments, the transition conductors may also be equidistant with respect to other transition conductors, and indeed the distance between two nearest neighbor turns may be constant for a plurality, and typically all, of the pairs of nearest neighbor turns.

Figure 15:
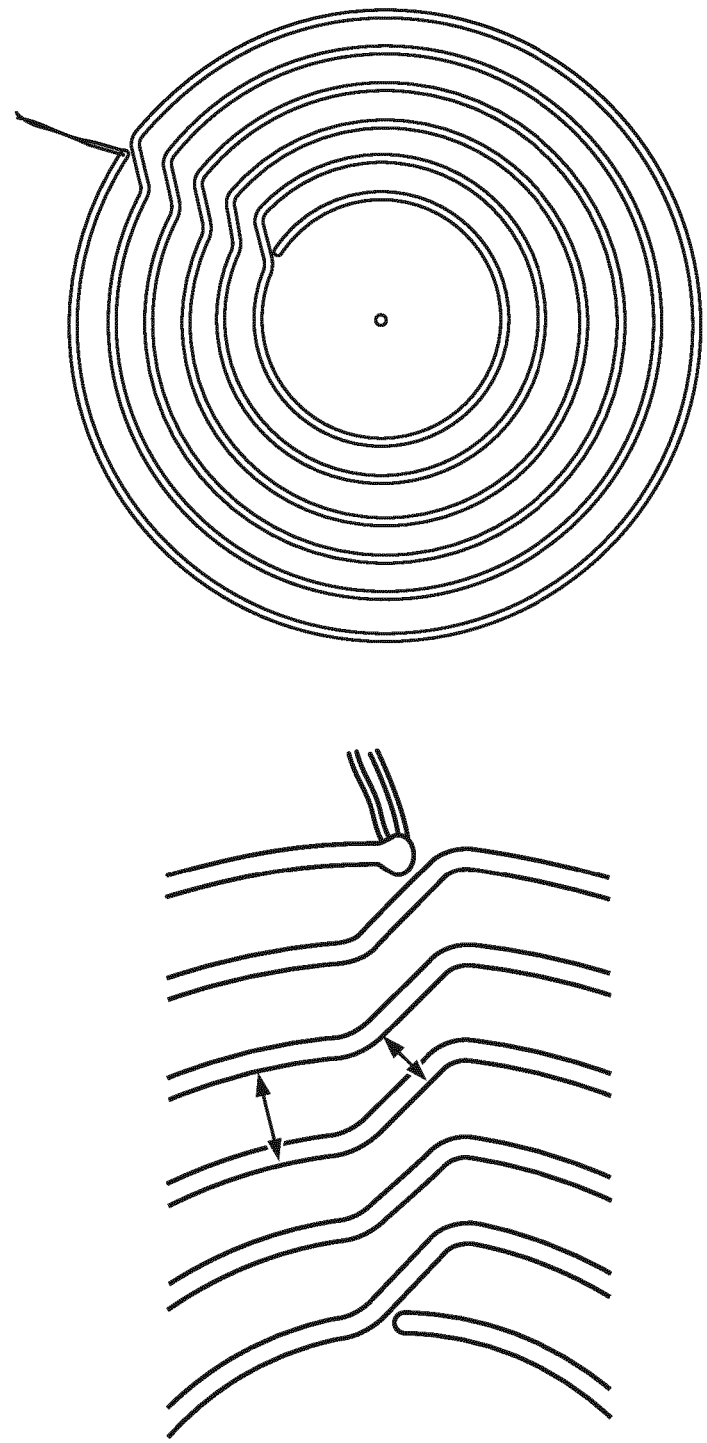
FIG. 15 illustrates an example of a communication coil for a power transfer system in accordance with some embodiments of the invention.
Figure 16:
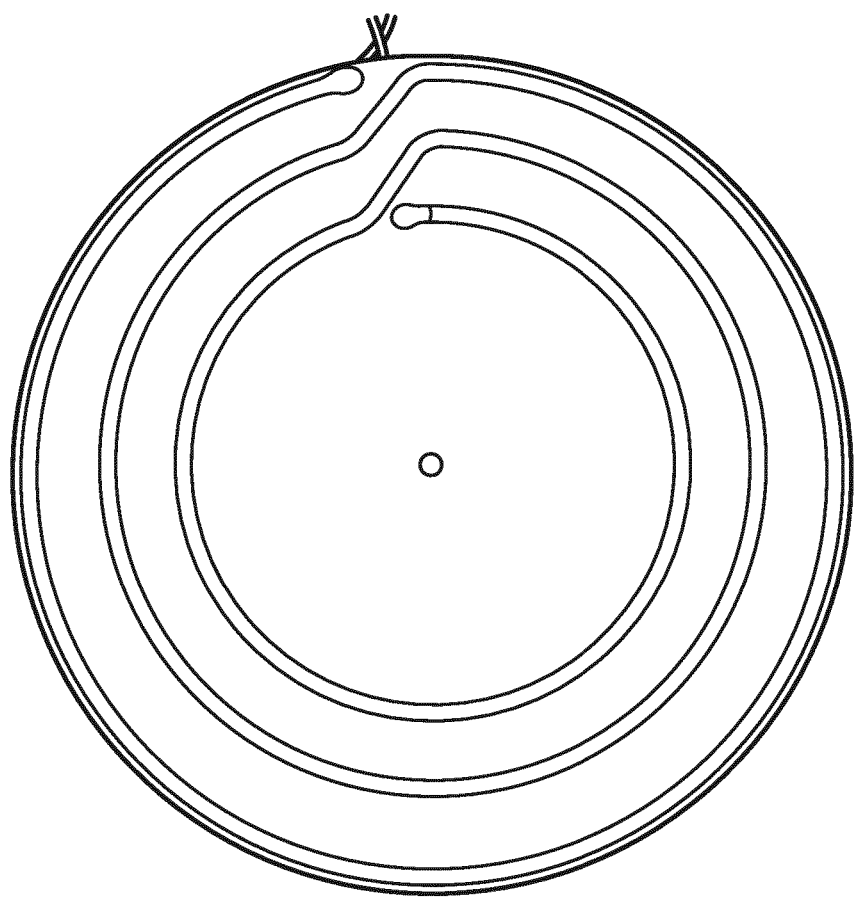
FIG. 16 illustrates an example of a communication coil for a power transfer system in accordance with some embodiments of the invention.

An example of such a communication coil is show in FIG. 15. The communication coil design of FIG. 15 may specifically be used for the first communication coil 207. Instead of a spiral antenna, the turns are for the most part circular except for small transition areas wherein partially radial conductors connect the different turns. FIG. 16 illustrates a corresponding design for the second communication coil 307.

Figure 17:
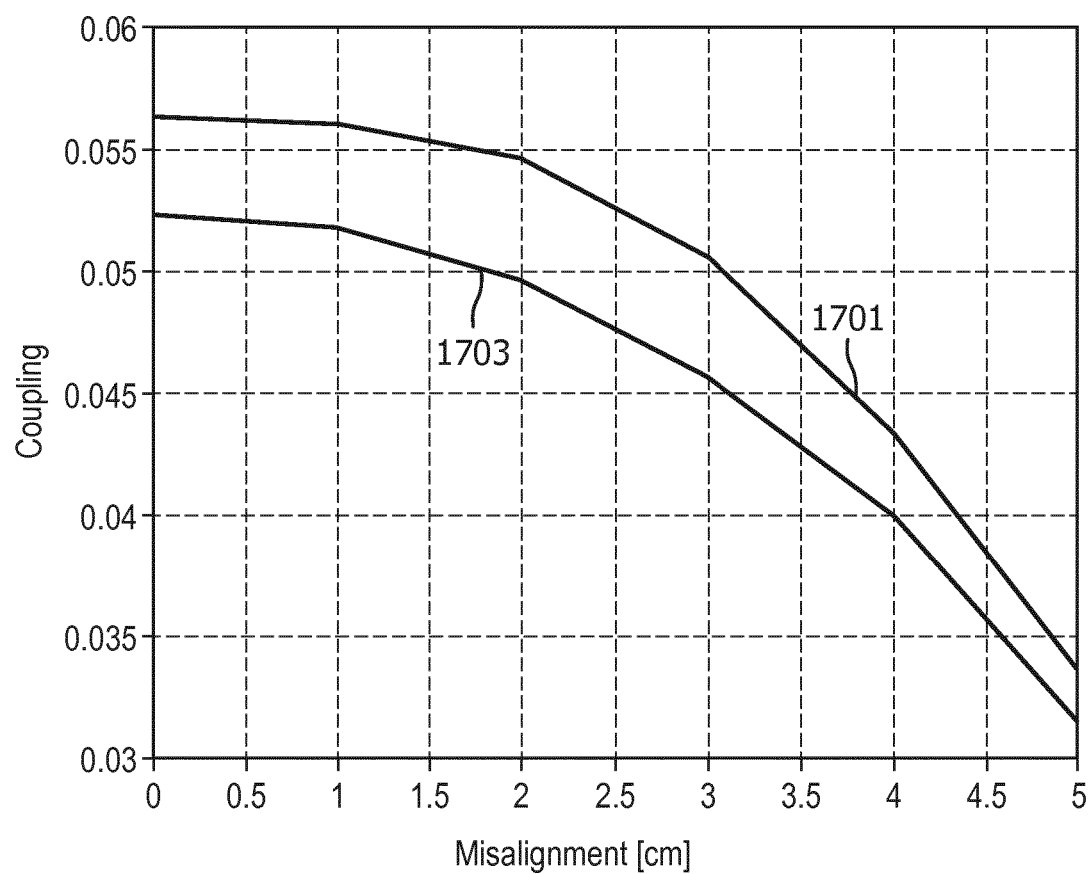
FIG. 17 illustrates measurements of coupling factors for different communication coils for a power transfer system in accordance with some embodiments of the invention.

FIG. 17 shows examples of measurements on the communication coils of FIGS. 15 and 16 compared to a spiral coil with the same dimensions. FIG. 17 illustrates the coupling 1701 for the circular communication coils compared to the coupling 1703 for the spiral communication coils. As can be seen, the specific approach provides improved coupling compared to a convention spiral coil, and thus an improved overall performance can typically be achieved. A spiral is never completely perpendicular to the diagonal line where it crosses the diagonal line, while a circle always is. This difference in angle of typically a few degrees also changes the direction of the field. It is very difficult to create a similar change in angle in both the receiver and transmitter communication coil, especially when misalignment needs to be accounted for. The advantage of a spiral antenna is a constant distance between the windings and no sharp corners are present in the winding layout, which results in a continuous impedance over the complete antenna. However, a corresponding effect may be achieved by the antenna of FIGS. 15 and 16, and especially the design may implement a circular antenna where the connections between the circular parts are made to be equidistant and to not contain sharp corners.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter for wireless power transfer comprising:
    a power transfer coil, wherein the power transfer coil is arranged to generate the power transfer signal;
    a communication antenna,
    wherein the communication antenna is arranged to communicate with a power receiver via a communication signal,
    wherein the communication antenna overlaps at least a portion of the power transfer coil;
    a controller circuit, wherein the controller circuit is arranged to control the power transmitter to transfer power during at least one power transfer interval(s) and to communicate during at least one communication interval(s);
    a magnetic shield material,
    wherein at least a portion of the magnetic shield material is positioned between the power transfer coil and the communication antenna,
    wherein the magnetic shield material has a saturation point such that the magnetic shield material operates in a saturated mode during the at least one power transfer interval(s) and in a non-saturated mode during the at least one communication interval(s),
    wherein the saturation point corresponds to a magnetic field strength higher than generated by the communication signal during the at least one communication interval(s),
    wherein the saturation point corresponds to a magnetic field strength lower than generated by the power transfer signal during the at least one power transfer interval(s),
    wherein the power transfer coil and the communication antenna are arranged such that the communication antenna is positioned between the power transfer coil and a power transfer coil of the power receiver during the wireless power transfer.

2. The power transmitter of claim 1, wherein the magnetic shield material is a sheet having a thickness less than or equal to 1 mm.

3. The power transmitter of claim 1, wherein the magnetic shield material is a ferrite material.

4. The power transmitter of claim 1,
    wherein the communication antenna is a planar antenna,
    wherein the planar antenna has an area of no less than 30 cm$^2$.

5. The power transmitter of claim 1, wherein an area of the power transfer coil is no less than 50 cm$^2$.

6. The power transmitter of claim 1, wherein the communication antenna and the power transfer coil are planar coils.

7. The power transmitter of claim 1, wherein the communication antenna and the power transfer coil are co-axial.

8. The power transmitter of claim 1, wherein the at least one power transfer interval(s) and the at least one communication time interval(s) are disjoint.

9. The power transmitter of claim 1, wherein the saturation point for the magnetic shield element is in a range from 100 mT to 1 T.

10. The power transmitter of claim 1, wherein the saturation point for the magnetic shield element is in a range from 200 mT to 400 mT.

11. A wireless power transfer system comprising:
    a power transmitter and a power receiver, the power transmitter comprising:
        a first power transfer coil, wherein the first power transfer coil is arranged to generate a power transfer signal;
        a first communication antenna,
            wherein the first communication antenna is arranged to communicate with the power receiver via a communication signal,
            wherein the first communication antenna overlaps at least a portion of the first power transfer coil;
        a first controller circuit, wherein the first controller circuit is arranged to control the power transmitter to transfer during at least one power transfer interval(s) and to communicate during at least one communication interval(s); and
        a first magnetic shield material,
            wherein at least a portion of the first magnetic shield material is positioned between the first power transfer coil and the first communication antenna,
            wherein the first magnetic shield material has a first saturation point such that the first magnetic shield material operates in a saturated mode during the at least one power transfer interval(s) and in a non-saturated mode during the at least one communication interval(s),
            wherein the first saturation point corresponds to a magnetic field strength higher than generated by the first communication antenna during the at least one communication interval(s),
            wherein the first saturation point corresponds to a magnetic field strength lower than generated by the first power transfer coil during the at least one power transfer interval(s); and
    the power receiver comprising:
        a second power transfer coil, wherein the second power transfer coil is arranged to receive the power transfer signal;
        a second communication antenna,
        wherein the second communication antenna is arranged to communicate with a power receiver via the communication signal,
            wherein the second communication antenna overlaps at least a portion of the second power transfer coil;
        a second controller circuit, wherein the second controller circuit is arranged to control the power receiver to perform power transfer during the at least one power transfer interval(s) and communication during the at least one communication interval(s);
        a second magnetic shield material,
            wherein the second magnetic shield material is positioned between the second power transfer coil and the second communication antenna;
            wherein the second magnetic shield material comprises a second magnetic shield material,
            wherein the second magnetic shield material has a second saturation point such that the second magnetic shield material operates in a saturated mode during the power transfer interval(s) and in a non-saturated mode during the at least one communication interval(s),
wherein the second saturation point corresponds to a magnetic field strength higher than generated by the first communication antenna during the at least one communication interval(s) and lower than generated by the first power transfer coil during the at least one power transfer interval(s),
wherein the first power transfer coil and the first communication antenna are arranged such that at least a portion of the first communication antenna is positioned between the first power transfer coil and the second power transfer coil during power transfer operation,
wherein the second power transfer coil and the second communication antenna are arranged such that the second communication antenna is positioned between the first power transfer coil and the second power transfer coil during power transfer operation.

12. A method of wireless power transfer from a power transmitter,
wherein the power transmitter comprises a communication antenna, a power transfer coil and a magnetic shield material,
wherein at least a portion of the communication antenna overlaps the power transfer coil,
wherein at least a portion of the magnetic shield material is positioned between the power transfer coil and the communication antenna;
wherein the magnetic shield material comprises a magnetic shield material has a saturation point such that the magnetic shield material operates in a saturated mode during power transfer interval(s) and in a non-saturated mode during communication interval(s);
wherein the saturation point corresponds to a magnetic field strength higher than generated by the communication signal during the communication interval(s),
wherein the saturation point corresponds to a magnetic field strength lower than generated by the power transfer signal during the power transfer interval(s),
wherein the power transfer coil and the communication antenna are arranged such that the communication antenna is positioned between the power transfer coil and a power transfer coil of a power receiver during power transfer operation, the method comprising:
generating a power transfer signal;
communicating with the power receiver via a communication signal; and
controlling the power transmitter to perform power transfer during at least one power transfer interval(s) and communication during at least one communication interval(s).

13. A computer program stored on a non-transitory medium, wherein the computer program when executed on a processor performs the method as claimed in claim 12.

14. A method of wireless power transfer from to a power receiver,
wherein the power receiver comprises a communication antenna, a power transfer coil and a magnetic shield material,
wherein the communication antenna overlaps a power transfer coil
wherein a magnetic shield material is positioned between the power transfer coil and the communication antenna,
wherein the magnetic shield material has a saturation point such that the magnetic shield material operates in a saturated mode during power transfer interval(s) and in a non-saturated mode during communication interval(s),
wherein the saturation point corresponds to a magnetic field strength higher than generated by the communication signal during the communication interval(s),
wherein the saturation point corresponds to a magnetic field strength lower than generated by the power transfer signal during the power transfer interval(s),
wherein the power transfer coil and the communication antenna are arranged such that the communication antenna is positioned between the power transfer coil and a power transfer coil of the power receiver during power transfer operation,
the method comprising:
receiving a power transfer signal;
communicating with a power transmitter via a communication signal,
controlling the power receiver to perform power transfer during at least one of the power transfer interval(s) and communication during at least one of the communication interval(s).

15. A computer program stored on a non-transitory medium, wherein the computer program when executed on a processor performs the method as claimed in claim 14.

16. A power receiver for wireless power transfer comprising:
a power transfer coil, wherein the power transfer coil is arranged to receive the power transfer signal;
a communication antenna,
wherein the communication antenna is arranged to communicate with a power transmitter via a communication signal,
wherein the communication antenna overlaps at least a portion of the power transfer coil;
a controller circuit, wherein the controller circuit is arranged to control the power receiver to transfer power during at least one power transfer interval(s) and to communicate during at least one communication interval(s); and
a magnetic shield material,
wherein at least a portion of the magnetic shield material is positioned between the power transfer coil and the communication antenna,
wherein the magnetic shield material has a saturation point such that the magnetic shield material operates in a saturated mode during the at least one power transfer interval(s) and in a non-saturated mode during the at least one communication interval(s),
wherein the saturation point corresponds to a magnetic field strength higher than generated by the communication signal during the at least one communication interval(s),
wherein the saturation point corresponds to a magnetic field strength lower than generated by the power transfer signal during the at least one power transfer interval(s),
wherein the power transfer coil and the communication antenna are arranged such that the communication antenna is positioned between the power transfer coil and a power transfer coil of the power transmitter during power transfer operation.

17. The power receiver of claim 16, wherein the magnetic shield material is a sheet element having a thickness less than or equal to 1 mm.

18. The power receiver of claim 16, wherein the magnetic shield material is a ferrite material.

19. The power receiver of claim 16, wherein the communication antenna is a planar antenna, wherein the planar antenna has an area of no less than 30 cm$^2$.

20. The power receiver of claim 16, wherein an area of the power transfer coil is no less than 50 cm$^2$.

21. The power transmitter of claim 16, wherein the communication antenna and the power transfer coil are planar coils.

22. The power receiver of claim 16, wherein the communication antenna and the power transfer coil are co-axial.

23. The power receiver of claim 16, wherein the at least one power transfer interval(s) and the at least one communication interval(s) are disjoint.

24. The power receiver of claim 16, wherein the saturation point for the magnetic shield element is in a range from 100 mT to 1 T.

25. The power receiver of claim 16, wherein the saturation point for the magnetic shield element is in a range from 200 mT to 400 mT.

* * * * *